July 24, 1956          M. WATTER          2,756,312
METHOD OF FORMING DOOR PANELS
Filed June 29, 1951
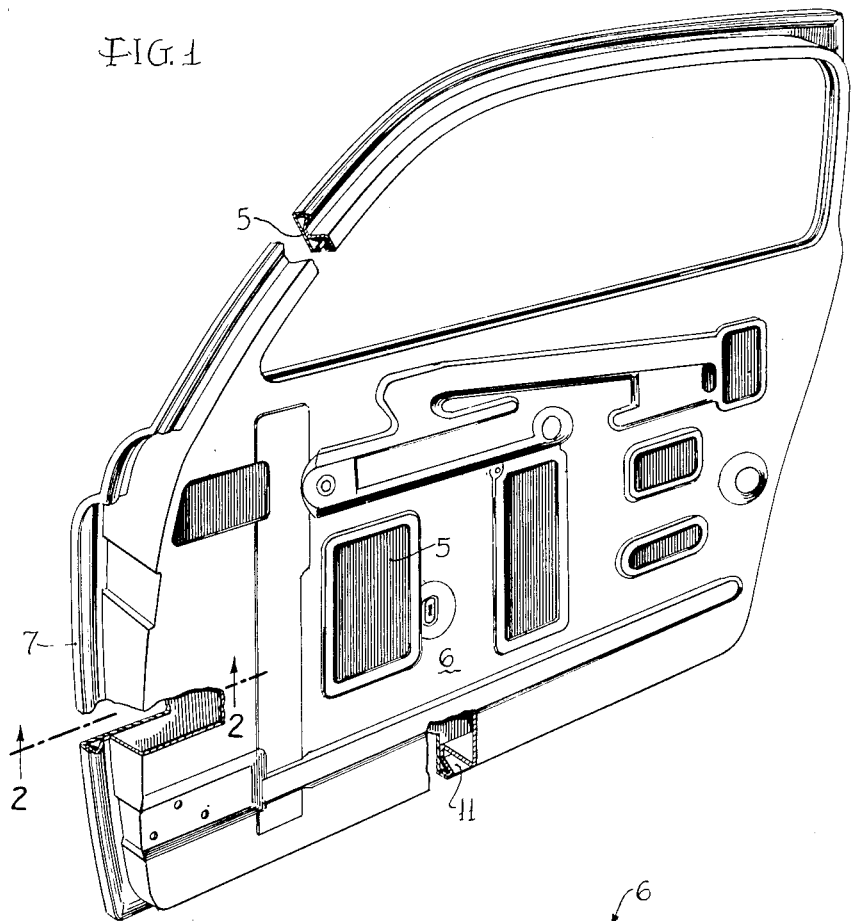
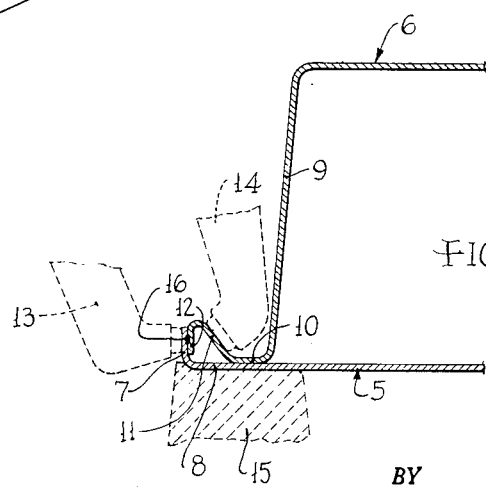
INVENTOR.
Michael Watter.
BY
Maurice A. Crews
ATTORNEY

United States Patent Office 2,756,312
Patented July 24, 1956

2,756,312

METHOD OF FORMING DOOR PANELS

Michael Watter, Philadelphia, Pa., assignor to The Budd Company, Philadelphia, Pa., a corporation of Pennsylvania Application June 29, 1951, Serial No. 234,375

1 Claim. (Cl. 219—10)

The invention relates to improvements in marginal connections between frame members and covering panels, particularly to connections between outer panel and door frame of automobile doors in the region of the overlap flanges.

An object of the invention is the avoidance of connections, e. g. spot welds, which are visible on the outer exposed surface of a panel.

A further object of the invention is the avoidance of connecting flanges which project away from panel and frame member and have sharp exposed edges.

A still further object of the invention is a connection of the indicated type which can be made conveniently and economically with substantially conventional connecting tools such as spot welders.

The aforesaid and other objects are achieved by providing panel and frame member with overlapping but oppositely directed marginal flanges by such arrangement of the flanges that they are accessible to spot welders, and by specific formation of flange and adjoining portion of the frame member.

The features of the invention will be more easily and fully understood from the embodiment illustrated in the attached drawing and described in the following.

In the drawing:

Fig. 1 is an inside perspective of the body of an automobile door, fragmentarily sectionalized in certain regions.

Fig. 2 is a fragmentary section on a larger scale along line 2—2 of Fig. 1, showing in dotted lines a pair of welding electrodes.

The illustrated door comprises an outer panel 5 and an inner panel 6.

Outer panel 5 is provided with a narrow inwardly directed flange 7 along its margins, the flange adjoining that marginal portion 8 of the panel 5 proper which constitutes the overlap flange.

Inner panel 6 is formed with a wide outwardly directed web 9 forming the main frame of the door. Web 9 is adjoined by a marginal flange 10, which in turn is continued by an outwardly open V-section portion or flange comprising legs 11 and 12. Leg 11 is directed at an inclination inwardly away from web 9, while leg 12 is an outwardly directed marginal flange. Flange 10 rests against the inside of outer panel 5. Leg 12 is formed and arranged for overlapping engagement with the inner surface of flange 7 of outer panel 5.

After panels 5 and 6 have been brought into the illustrated position relative to each other, outer flange 7 is directly engaged by one electrode 13 of the pincer type spot welder (not shown), the other electrode 14 engages leg 11, and the outer panel rests on a support 15. Upon application of welding pressure and current, a spot weld connection 16 is effected between flange 7 and leg 12. In this procedure pressure and current are transmitted from electrode 14 over leg 11 to leg 12. Such spot welds are made in the desired number and with the desired spacing from each other all along the perimeter of the illustrated door structure.

The weld spots 16 are removed from the exposed outer surface of panel 5 and will not be visible when the door is within its door opening (not shown). The configuration of the marginal portions of the members 5 and 6 strengthens and stiffens the structure. There are no exposed sharp, jagged edges, partly because flange 7 ends short of the apex of sections 11, 12. The welding connections can conveniently be made without reaching with the welding tools into the interior of the structure.

The invention is applicable not only to automobile doors but to other structures, such as trunk lids or hollow-section beams. While doors for automobiles, such as the door illustrated in the drawing, are customarily made of carbon steel stampings, the invention is not restricted to this type of steel but is applicable to structural members made of other materials, such as stainless steel.

In general, the invention is susceptible of further modifications and adaptations without departing from its basic concept. For instance, holes may be provided in leg 11 allowing direct engagement of leg 12 and electrode 14.

What is claimed is:

Method of spot welding a structure comprising an outer panel and a web, the panel having a marginal flange extending at about a right angle thereto and the web being provided thereon with a marginal channel section including an outer leg and an inner leg: the step of bringing the outer panel and the web in such position that they extend transversely to each other and that said flange and said outer leg overlap each other, the step of engaging said flange by one welding electrode and said inner leg by a second welding electrode, and the step of applying welding pressure and current thereby effecting a spot weld between said flange and said outer leg.

References Cited in the file of this patent

UNITED STATES PATENTS

| Number | Name | Date |
|---|---|---|
| 1,090,218 | Kruse | Mar. 17, 1914 |
| 1,248,945 | Stoner | Dec. 21, 1917 |
| 1,703,541 | Pierson | Feb. 26, 1929 |
| 1,705,173 | Bohnsack | Mar. 12, 1929 |
| 1,796,114 | Meadowcraft | Mar. 10, 1931 |
| 1,861,970 | Meadowcraft | June 7, 1932 |
| 2,062,287 | Block | Dec. 1, 1936 |

FOREIGN PATENTS

| Number | Country | Date |
|---|---|---|
| 982,171 | France | Jan. 29, 1951 |